United States Patent [19]

Iannicelli et al.

[11] Patent Number: 5,376,605
[45] Date of Patent: Dec. 27, 1994

[54] PROCESS FOR BENEFICIATING MINNESOTA KAOLIN

[75] Inventors: Joseph Iannicelli, Jekyll Island; Joseph E. Pechin, Brunswick, both of Ga.

[73] Assignee: Aquafine Corporation, Brunswick, Ga.

[21] Appl. No.: 126,022

[22] Filed: Sep. 24, 1993

Related U.S. Application Data

[63] Continuation of Ser. No. 876,779, Apr. 30, 1992, abandoned.

[51] Int. Cl.⁵ .............................................. C04B 33/04
[52] U.S. Cl. ...................... 501/146; 501/147; 106/486; 106/488; 162/181.8; 423/156
[58] Field of Search ............. 501/144, 146, 147, 148; 106/486, 488, 416, 418; 162/181.8; 423/156; C04B 33/04

[56] References Cited

U.S. PATENT DOCUMENTS

| | | |
|---|---|---|
| 3,193,344 | 7/1965 | Iannicelli et al. |
| 3,798,044 | 3/1974 | Whitley et al. ............ 106/486 |
| 3,826,365 | 7/1974 | Mercade . |
| 3,853,983 | 12/1974 | Abercrombie, Jr. et al. . |
| 3,961,971 | 6/1976 | Abercrombie, Jr. et al. ...... 501/150 |
| 3,974,067 | 8/1976 | Nott . |
| 4,055,485 | 10/1977 | Nott . |
| 4,097,372 | 6/1978 | Nott . |
| 4,227,920 | 10/1980 | Chapman et al. . |
| 4,281,799 | 8/1981 | Oder .................................. 106/486 |
| 4,419,228 | 12/1983 | Cook et al. . |
| 4,492,628 | 1/1985 | Young et al. . |
| 4,781,298 | 11/1988 | Hemstock et al. . |
| 4,851,048 | 7/1989 | Jones et al. . |
| 4,997,550 | 3/1991 | Cobb et al. . |
| 5,061,461 | 10/1991 | Sennett et al. . |
| 5,085,707 | 2/1992 | Bundy et al. . |
| 5,143,599 | 9/1992 | Derdall et al. ..................... 501/146 |

FOREIGN PATENT DOCUMENTS

| | | |
|---|---|---|
| 0004512 | 2/1968 | Japan ................................. 501/146 |
| 0000126 | of 1877 | United Kingdom ............... 501/146 |
| 0480671 | 5/1975 | U.S.S.R. ............................ 501/146 |

OTHER PUBLICATIONS

Xie et al. "High Gradient Magnetic Separation and Chemical Bleaching of Guoshan Kaolin" (1986) Feijinshukang (1), 30–6, 42 Peoples Republic of China.
"Magnetic Separations Near Market Breakthrough" (Jan. 28, 1974) C9EN pp. 21–22.

Primary Examiner—Mark L. Bell
Assistant Examiner—Paul Marcantoni
Attorney, Agent, or Firm—Banner, Birch, McKie and Beckett

[57] ABSTRACT

A process for increasing the brightness of Minnesota kaolin clay containing chlorite and siderite mineral impurities comprising treating the clay with a strong mineral acid preferably in combination with magnetic separation.

11 Claims, No Drawings

PROCESS FOR BENEFICIATING MINNESOTA KAOLIN

CROSS-REFERENCE TO RELATED CASES

This application is a continuation of application Ser. No. 07/876,779, filed Apr. 30, 1992, abandoned.

Reference is hereby made to the earlier filed Disclosure Document No. 300024 filed by the inventors on Dec. 23, 1991 and entitled "Acid Leaching of Minnesota Primary Kaolin to Enhance Response to Magnetic Separation."

BACKGROUND OF THE INVENTION

1. Field of the Invention

This invention relates to a process for treating a kaolin clay contaminated with iron-containing minerals such as chlorite and siderite to improve its brightness and, more particularly, to an improved process of bleaching a Minnesota primary kaolin clay with a novel combination of a strong acid leach and a magnetic separation.

2. Description of Related Art

Extensive deposits of a primary kaolin in the Minnesota River Valley region of the United States have been known for many years. These deposits have been evaluated on numerous occasions over the past fifty years in attempts to produce a kaolin suitable for paper coating and paper filling applications. Among the agencies that have been involved in unsuccessful attempts to commercialize Minnesota kaolin have been the Legislative Commission on Minnesota Resources (LCMR), the Minnesota Department of Natural Resources, the Minnesota Geological Survey, Natural Resources Research Institute, and the Mineral Resources Research Center. At least one of the major kaolin producers in Georgia has worked with these clays and holds extensive mineral rights in the area. Notwithstanding these efforts, thus far no one has identified a suitable process for producing an 80-87 brightness kaolin as measured by the standard G.E. scale (see TAPPI Procedure T-646-05-75 and T-649-05-75) on a meaningful portion of these reserves. As those skilled in this art appreciate (e.g., see U.S. Pat. No. 4,997,550), even brightness improvement of less than a full point can be very significant.

Among the beneficiation methods previously tried on Minnesota kaolin are the following: degritting and fractionation followed by steps such as high gradient magnetic separation (HGMS), flotation, delamination and leaching with sodium dithionite (hydrosulphite), normally under an acid condition. In most cases, the degritted brightness of the Minnesota kaolin is in the 60-70 brightness range and even magnetic separation rarely furnishes more than 5 brightness points improvement. Sodium dithionite leaching raises the brightness a maximum of 10 points, but the resulting low brightness kaolin remains below about 80 brightness nonetheless, and does not consistently meet kaolin paper filler standards.

U.S. Pat. No. 3,193,344 describes a process for bleaching kaolin clay contaminated with highly colored iron impurities using the combination of a reducing agent and an iron binding agent generally described as a water-soluble polyfunctional organic compound, one active group of which comprises a mercaptan (—SH) radical and another active group of which comprises a radical, which together with the mercaptan group is capable of chelating iron. According to the patent, the clay first is treated with the reducing agent to solubilize iron as ferrous iron. Preferably, the reaction of the clay and the reducing agent is conducted at a slight degree of acidity. Water-soluble salts of hydrosulphurous acid are preferably employed as the reducing agent. Salts identified as particularly satisfactory for this purpose include sodium hydrosulphite, zinc hydrosulphite, and calcium hydrosulphite. Further, hydrosulphurous compounds, such as taught in U.S. Pat. No. 2,339,594 also are taught; e.g., alkali metal and zinc salts of hydrosulphurous acids and the sulfoxylates.

Thereafter, the reduced clay is treated with the iron binding agent. Preferably such iron binding agent is a water-soluble acid containing a carboxyl and a mercaptan group, preferably with the —SH group in the alpha position relative to the carboxyl or group, such as in mercaptoacetic acid. Such a mercapto-carboxy acid forms in aqueous solution a water-soluble, or at least a water-dispersible, compound or complex of sufficiently slight degree of dissociation to prevent reaction of iron and oxygen in a reaction mixture and thus so prevents oxidation and reabsorption of iron on the clay from which it was previously removed. The complexed iron then is readily removed from the clay, as by filtration. Other compounds which similarly form water-soluble compounds with ferrous iron of a sufficiently low degree of dissociation to prevent reoxidation of ferrous iron compounds to ferric iron compounds in presence of dissolved oxygen, water, and clay include thiomalic acid and mercaptoethanol. For convenience, the clay can be treated with a mixture of the reducing agent and the iron binding agent. This admixture of such dibasic mercaptan acid and reducing sulfoxylate is effective at the relatively acid pH conditions at which such sulfoxylate is most effective to reduce iron compounds associated with even relatively acid reacting clays without producing an objectionable or strong odor.

U.S. Pat. Nos. 5,061,461 and 5,085,707 also describe techniques used for processing kaolin clay, particularly clay used for paper tiller and coatings. In summarizing conventional processing procedures, it is noted that following initial particle sizing, the clay is leached to remove iron-based color compounds by first acidifying the clay with sulfuric acid or alum to a pH of 3 to 5 to solubilize the iron and flocculate the clay, which aids subsequent filtration, followed by treatment with a reducing bleach agent such as sodium hydrosulphite (dithionite) which generally is more effective at an acid pH. This bleaching, typically conducted at a kaolin slurry solids content of about 30 to 40%, reduces the iron to the more soluble ferrous form. The iron then is removed via a dewatering process (filtration). The clay is flocculated and then dewatered to a solids level of about 60%. The filter cake then either is dried or redispersed with additional clay if it is to be sold as about a 70% solids slurry. The '707 patent indicates that to produce high brightness products, the clay may be processed through flotation or magnetic separation. As noted in the '461 patent this normally takes place before dithionite leaching and filtration. See also U.S. Pat. No. 3,853,983 in this regard, which describes a process for improving the brightness of an iron pyrite-contaminated clay using a combination of magnetic separation and dithionite leaching.

Other patents that relate to the beneficiation and brightening of kaolin clays include U.S. Pat. Nos. 3,826,365; 3,853,983; 4,055,485; 4,227,920; 4,419,228; and 4,781,298.

DESCRIPTION OF THE INVENTION

It has surprisingly been discovered that Minnesota primary kaolin clay containing chlorite and siderite mineral impurities having a substandard brightness such as in the 50–70 range can be raised to a commercially satisfactory level of brightness in the 80–90 range using a process that consists essentially of acid leaching at a low pH with a strong mineral acid preferably in conjunction with magnetic separation. Using the process of the present invention the brightness of a crude Minnesota primary kaolin clay (particle size typically less than 325 mesh) can be increased 10 to 15 or more G.E. brightness points over conventional processing.

The clay minerals in the Minnesota River Valley were formed from the weathering of felsic rock types such as granite. As is characteristic of primary kaolins, the Minnesota kaolin contains substantial quantities of quartz sand amounting to 40–60% of the primary crude kaolin. The kaolin also is heavily contaminated with chlorite and siderite impurities.

In accordance with this invention, after conventional preliminary treatment and beneficiation, an aqueous slurry of the Minnesota kaolin generally at a solids content between about 20 and 60% by weight and more usually between 25 and 50%, is treated with a strong mineral acid in an amount between about 0.1 to 10.0% by weight, preferably between about 0.5 to 10% by weight, and most usually at about at least 1% by weight, so as to result in a slurry pH below about 3.0 and generally between about 1 and 3 in the kaolin slurry. The weight percent acid reagent is based on the weight of active acid per unit weight of kaolin solids in the slurry. Conventional preliminary treatment generally involves crushing the kaolin crude ore, pulping the crushed ore in water, degritting, and fractionation, to recover one or more fractions of a desired particle size distribution. Flotation treatment of a fractionated portion of the crude also may be utilized as an additional step to remove colored impurities. Preferably, the kaolin slurry subjected to the acid leaching of the present invention has a solids content of 25 to 40%. Suitable acids are the strong acids having a pKa of less than 3.0 and include sulfuric acid, phosphoric acid, nitric acid and hydrochloric acid.

In accordance with a preferred embodiment of the invention, either before or after the acid leach step, the kaolin slurry is subjected to conventional magnetic separation treatment. Preferably the magnetic separation is done before the acid leach treatment. The conditions for magnetic separation are not narrowly critical, and the typical conditions and processes used in the prior art and well known to those skilled in the art for beneficiating a kaolin slurry using magnetic separation (HGMS) can suitably be employed. For specific guidance on the magnetic separation step, please refer to U.S. Pat. Nos. 3,471,011, 3,667,689, and 3,974,067 for further information, the relevant disclosure of which are hereby incorporated by reference. The magnetic separation is conducted on a kaolin slurry having a solids density of at least 15 wt. %.

Following acid leaching, the kaolin slurry is dewatered, possibly with washing, using conventional kaolin filtration (solid separation) procedures, to produce a solids content cake generally at least 10 to 40% higher than the starting slurry. Normally, the solids content of the dewatered cake is above 60–70%.

The following examples are given as specific illustrations of the present invention, and not for the purpose of limiting the invention. Reference should be made to the appended claims to determine the invention's scope.

EXAMPLE 1

A sample of crude primary Minnesota kaolin from the Minnesota River Valley was screened through a 325 mesh screen and a slurry containing 26% solids (−325 mesh) kaolin by weight was mixed with 1% by weight active hydrochloric acid from a 37% solution based on the weight of the kaolin, stored for 16 hours and then filtered. The initial GE brightness of the kaolin was 68.5. After the acid leaching process, the brightness was raised to 79.4.

EXAMPLE 2

Example 1 was repeated using 1% by weight hydrochloric acid based on the weight of the kaolin and the slurry was rapidly agitated for 20 minutes at a temperature of 120° F. After filtering, washing and drying, the treated kaolin had a brightness of 81.3, an increase of 12.8 points.

EXAMPLE 3

Example 2 was repeated except that 1% by weight (based on the weight of kaolin solids) concentrated (85%) phosphoric acid was used in lieu of hydrochloric acid. The finished brightness of the acid leached clay was 84.0, a significant increase of 15.5 points.

EXAMPLE 4

The procedure of Example 3 was repeated using a different source of Minnesota kaolin which after delamination had an initial brightness of 70.0. This clay first was treated by two passes through a magnetic separator, giving a clay having a brightness of 74.7. After treating the magnetically separated clay with hydrochloric acid in an amount of 1% by weight active basis as described in Example 3, the clay brightness was raised to 82.2.

EXAMPLE 5

In this example, the magnetically separated clay of Example 4 was acid leached with concentrated phosphoric acid (85%). The clay brightness after magnetic separation, as above, was 74.7. After treating the clay with 1 wt. % phosphoric acid active basis, the brightness of the clay was raised to 83.6.

Other strong mineral acids such as nitric and sulfuric acid produce results nearly equivalent to hydrochloric acid.

Mineral acid leaching on these clays is significantly more effective than leaching with sodium dithionite at an acid pH which is the industry standard in kaolin production. A comparison of the acid leaching agent of the present invention with the prior art sodium dithionite leaching, the industry standard, is shown in Example 6.

EXAMPLE 6

A crude Minnesota primary kaolin from the Minnesota River Valley was dispersed in water to produce a 50% solids slurry. After screening the slurry on a 100 mesh screen, the kaolin (−100 mesh) had a brightness of 60.8. Delamination raised the brightness to 70.9 and after magnetic separation this was raised to 72.8. Reduction leaching of this clay using 0.5% by weight sodium dithionite at a pH of 3.0 to 3.5 raised the brightness to 78.0. Further leaching of this 78.0 brightness clay with phosphoric acid as described in Example 2 raised the brightness of the clay further to 87.7, an increase of nearly 9 points.

Use of high shear with the phosphoric acid leach produced a brightness of 87 to 90 starting with chide clay having a brightness in the range of 60 to 70.

EXAMPLE 7

A crude Minnesota kaolin from the Minnesota River Valley was dispersed in water to produce 50% solids slurry. After degritting on a 325 mesh (44 micron) screen the brightness of the less than 325 sieve fraction was 69.5. The sample was treated with 1% hydrochloric acid in accordance with Example 2. The brightness of the acid leached product was 74.0. The leached clay was then redispersed in water and passed through the magnetic separator operating at 20 kilogauss with a one minute retention time. The brightness of the recovered nonmagnetic fraction was 76.

EXAMPLE 8

The same crude Minnesota kaolin as used in Example 7 was degritted to produce a minus 44 micron fraction having a brightness of 69.5. This sample was treated on the magnetic separator operating at 20 kilogauss and using one minute retention time. The resulting nonmagnetic fraction had a brightness of 71.6. This product then was leached with 1% hydrochloric acid as described in Example 7 and produced a kaolin clay having a brightness of 81.1.

A comparison of the results in Examples 7 and 8 shows that magnetic separation prior to acid leaching gives superior results. Another advantage of conducting the acid leaching after magnetic separation is that the clay can be directly filtered, redispersed, and dried. It has been found that the acid leach treatment eliminates the necessity for a dithionite leaching.

Dithionite leaching of mineral acid-treated Minnesota kaolin resulted in negligible brightness increases, thereby rendering the dithionite leaching unnecessary. Therefore, the mineral acid leaching of these clays is a more effective substitute for dithionite leaching. The mineral acid can be added before magnetic separation and after the fractionation where it becomes the flocculating agent for the clay prior to filtration.

By means of the process of this invention, it now is possible to convert a significant portion of the up to present nearly useless Minnesota kaolins into excellent paper filling clays and high quality paper coating clays. The application of acid leaching to these clays produces a totally unexpected beneficial result which far exceeds the results of applying these acids to normal coating clays from the Georgia area.

The principles, preferred embodiments and modes of operation of the present invention have been described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit of the invention.

We claim:

1. A process for treating Minnesota kaolin clay containing chlorite and siderite mineral iron impurities to increase its G.E. brightness to a level acceptable for paper making consisting essentially of crushing crude Minnesota Kaolin; pulping the crushed kaolin in water to create a slurry; degritting the slurry; fractionating the slurry; mixing the slurry with phosphoric acid or hydrochloric acid in an amount to provide between 0.1 and 10% acid by weight of clay solids in the slurry and a slurry pH of less than about 3.0 for a time sufficient to increase the G.E. brightness of said clay, subjecting said slurry to magnetic separation at a solids density of at least 15% and separating said kaolin clay having an increased brightness acceptable for paper making from said acid.

2. The process of claim 1 wherein the magnetic separation is done before the mixing step.

3. The process of claim 1 wherein phosphoric acid is mixed with said clay.

4. The process of claim 1 wherein the magnetic separation is done after the mixing step.

5. The process of claim 1 wherein said hydrochloric acid or phosphoric acid is mixed with said clay both before the magnetic separation and after the magnetic separation.

6. A process for treating Minnesota kaolin clay containing chlorite and siderite mineral iron impurities to increase its G.E. brightness to a level acceptable for paper making without using dithionite consisting essentially of crushing crude Minnesota kaolin; pulping the crushed kaolin in water to create a slurry; degritting the slurry; fractionating the slurry; mixing the slurry with phosphoric acid or hydrochloric acid, in the absence of dithionite, in an amount to provide between 0.1 and 10% acid by weight of clay solids in the slurry and a slurry pH of less than about 3.0 for a time sufficient to increase the G.E. brightness of said clay, and separating said kaolin clay having an increased brightness acceptable for paper making from said acid.

7. The process of claim 5, further comprising passing the clay through a magnetic separator.

8. The process of claim 7 wherein the magnetic separation is done before the mixing step.

9. The process of claim 7 wherein the magnetic separation is done after the mixing step.

10. The process of claim 7 wherein said hydrochloric acid or phosphoric acid is mixed with said clay both before the magnetic separation and after the magnetic separation.

11. The process of claim 6 wherein phosphoric acid is mixed with said clay.

* * * * *

UNITED STATES PATENT AND TRADEMARK OFFICE
CERTIFICATE OF CORRECTION

PATENT NO. : 5,376,605
DATED : December 27, 1994
INVENTOR(S) : Joseph Iannicelli and Joseph E. Pechin It is certified that error appears in the above-indentified patent and that said Letters Patent is hereby corrected as shown below:

IN THE CLAIMS

In claim 7, column 6, line 47, please delete the number "5" and insert therefor --6--.

Signed and Sealed this

Fourteenth Day of May, 1996

Attest:

BRUCE LEHMAN

*Attesting Officer*   *Commissioner of Patents and Trademarks*